(12) United States Patent
Callais et al.

(10) Patent No.: US 7,834,081 B2
(45) Date of Patent: Nov. 16, 2010

(54) METHODS OF PRODUCING VINYL AROMATIC POLYMERS USING (METH)ACRYLIC MACROINITIATORS

(75) Inventors: Peter A. Callais, Conroe, TX (US); Scott C. Schmidt, West Chester, PA (US); Barbara L. Stainbrook, Lawrenceville, PA (US); Nicolas Passade-Boupat, Pau (FR); Pierre Gerard, Denguin (FR); Stephanie Magnet, Morlanne (FR)

(73) Assignee: Arkema Inc., Philadelphia, PA (US)

( * ) Notice: Subject to any disclaimer, the term of this patent is extended or adjusted under 35 U.S.C. 154(b) by 58 days.

(21) Appl. No.: 11/996,612

(22) PCT Filed: Aug. 1, 2006

(86) PCT No.: PCT/US2006/029772
§ 371 (c)(1),
(2), (4) Date: Jun. 12, 2008

(87) PCT Pub. No.: WO2007/016499
PCT Pub. Date: Feb. 8, 2007

(65) Prior Publication Data
US 2008/0242791 A1 Oct. 2, 2008

Related U.S. Application Data

(60) Provisional application No. 60/704,833, filed on Aug. 2, 2005, provisional application No. 60/750,869, filed on Dec. 16, 2005.

(51) Int. Cl.
*C08L 39/00* (2006.01)
*C08F 265/02* (2006.01)
*C08F 293/00* (2006.01)
*C08F 2/22* (2006.01)

(52) U.S. Cl. ............... 524/529; 524/504; 524/505; 524/518; 525/75; 525/78; 525/85; 525/92 F; 525/92 L; 525/94; 525/244; 525/259

(58) Field of Classification Search .......... 525/242, 525/243, 299, 75, 78, 85, 92 F, 92 L, 94, 525/244, 259; 526/193, 220; 524/504, 505, 524/518, 539
See application file for complete search history.

(56) References Cited

U.S. PATENT DOCUMENTS

| 4,271,060 | A | 6/1981 | Hubby |
| 5,627,248 | A | 5/1997 | Koster et al. |
| 5,721,320 | A | 2/1998 | Priddy et al. |
| 5,945,491 | A | 8/1999 | Matyjaszewski et al. |
| 6,239,226 | B1 | 5/2001 | Fischer et al. |
| 6,255,402 | B1 | 7/2001 | Boutillier et al. |
| 6,255,448 | B1 | 7/2001 | Grimaldi et al. |
| 6,437,043 | B1 | 8/2002 | Sosa et al. |
| 6,538,091 | B1 | 3/2003 | Matyjaszewski et al. |
| 6,569,967 | B1 | 5/2003 | Couturier et al. |
| 6,624,322 | B1 | 9/2003 | Gillet et al. |
| 6,646,079 | B2 | 11/2003 | Guerret et al. |
| 6,657,043 | B1 | 12/2003 | Guerret et al. |
| 7,199,214 | B2 | 4/2007 | Couturier et al. |
| 2004/0138393 | A1 | 7/2004 | Pfaendner et al. |
| 2006/0142511 | A1 | 6/2006 | Couturier et al. |

FOREIGN PATENT DOCUMENTS

WO     WO 00/69867     11/2000

OTHER PUBLICATIONS

Ananchenko et al., Decomposition of Model Alkoxyamines in Simple and Polymerized System. II. Diastereomerix N-(2-Methlypropyl)-N-(1-diethyl-phosphono-2,2-dimethyl-propyl)-aminoxyl-Based Compounds, Journal of Polymer Science: Part A: Polymer Chemistry, vol. 40, pp. 3264.
Benoit et al.,Controlled Free-Radical Polymerization in the Presence of a Novel Asymmetric Nitroxyl Radical, Polym. Prep., 1997, 38(1), pp. 729-730.
Hawker et al., Development of a Universal Alkoxyamine for Living Free Radical Polymerization Using Combinatorial Techniques, Poly. Mater. Sci. Eng., 1999, 80, pp. 90-91.
Hawker et al., Initiating Systems for Nitroxide-Mediated "Living" Free Radical Polymerizations: Synthesis and Evaluation, Macromolecules, 1996, vol. 29, No. 16, pp. 5245-5254.
Benoit, D., Development of a Universal Alkoxyamine for "Living" Free Radical Polymerization, J. Amer. Chem Soc., Apr. 1999. vol. 121, pp. 3904-3920.
Couvreur, L., First Nitroxide-Mediated Controlled Free-Radical Polymerization of Acrylic Acid, Macromolecules, Oct. 2003, vol. 36, pp. 8260-8267.
Lefay, C. End-Group Characterization of Poly(acrylic acid) Prepared by Nitroxide-Mediated Controlled Free-Radical Polymerization, Macromol. Rapid Commum., May 2004, vol. 25, pp. 1215-1220.
Robin, S., Synthesis and Characterization of Poly(styrene-b-n-butyl acrylate-b-styrene) Triblock Copolymers Using Dialkoxyamine as Initiator, Macromolecules, 2002, 35(10) pp. 3844-3848 (Abstract).

*Primary Examiner*—Fred M Teskin
(74) *Attorney, Agent, or Firm*—Steven D. Boyd

(57) ABSTRACT

The present invention relates to the use of poly acrylic and/or methacrylic macroinitiators in the free radical addition reaction of vinyl aromatic monomers to improve the properties of the resulting copolymer and/or composite. More particularly, the present invention relates to the production of poly acrylic and/or poly methacrylic macroinitiators having nitroxyl end groups. Using such macroinitiators in the free radical addition reaction of vinyl aromatics such as polystyrene compatibilizes the acrylic monomer in the vinyl aromatic matrix thereby improving the properties of the resulting polymer.

11 Claims, 6 Drawing Sheets

METHODS OF PRODUCING VINYL AROMATIC POLYMERS USING (METH)ACRYLIC MACROINITIATORS

FIELD OF THE INVENTION

The present invention relates to the use of poly acrylic and methacrylic macroinitiators in a bulk, batch-wise, suspension, solution, emulsion, composites molding, or continuous vinyl aromatic polymerization process and the corresponding composites formed therewith.

BACKGROUND OF THE INVENTION

Pure polystyrene such as General Purpose Polystyrene (GPPS), Expandable Polystyrene (EPS) or Oriented Polystyrene (OPS), a vinyl aromatic polymer, is considered a brittle polymer. The preparation of modified vinyl aromatic polymers such as modified polystyrene to alter its physical and mechanical properties is known. An example of conventional rubber-modified polystyrene manufacture is disclosed in U.S. Pat. No. 4,271,060. Typical modification processes can include a bulk, suspension or continuous process in which one or more additional monomers or polymers are combined with the vinyl aromatic. With polystyrene, current commercial products include a modified polystyrene polymer based upon either grafted conjugated diene rubbers (high impact polystyrene, HIPS); or physical blends of anionically-produced thermoplastics, such as, styrene-butadiene-styrene (SBS) block copolymers and general purpose polystyrene (GPPS) that yield transparent impact polystyrene (TIPS). Current HIPS products are not transparent.

Various thermosetting polyester compositions are known which, when molded, exhibit desirable mechanical properties. These composites will be referred to as unsaturated polyester resins (UPR). Polyester resins are widely used in molding applications in liquid form. Such liquid resins comprise a liquid solution of a liquid or solid polyester dissolved in a liquid crosslinking agent such as, for example, styrene. Commercial polyester resins usually contain 35-45% styrene, by weight. All percentages given herein are weight percent unless otherwise specified. Optimum physical properties are obtained around this level. The liquid polyester resin can optionally further include additional components including but not limited to glass fiber reinforcements and/or fillers, such as calcium carbonate or talc, free radical sources, such as peroxides, low profile additives (LPA), pigments, thickeners, inhibitors, toughening agents, release agents, and other components, as will be evident to those skilled in the art. Still, these UPR composites are typically brittle. This brittleness can often lead to catastrophic part failure. Furthermore the brittle parts can develop micro-cracks that detract from the quality of the surface and lead to problems with painted UPR composite parts. The low profile additives are used, in part, to prevent shrinkage. However, shrinkage of UPR composite parts still presents difficulties for fabricators.

The UPR curing reaction is usually initiated by the addition of a peroxide catalyst. Polar monomers and additives are sometimes used in these polyester compounds to improve paintability.

The mixing of different polymer types can dramatically change the physical properties of the resulting materials. For example, the addition of a "rubbery" material such as butadiene to "brittle" polystyrene changes its impact resistance. It is generally accepted that the morphology of these blends dictates the final bulk properties. Furthermore, it is known that most polymer pairs are immiscible due to the minimal entropy of mixing associated with large molecules. Thus blending polymers having different structures prevents thorough mixing and phase separation occurs. This phase separation can lead to poor properties and lack of morphology control. Block copolymers physically mixed into other polymers of similar structure are known to be compatible mixtures. Block copolymers are most commonly produced via living anionic polymerization techniques. Polymers produced via such techniques typically have chain ends that are terminated with non-reactive groups and cannot be used to subsequently reinitiate further polymerization reactions.

To improve the impact resistance of polystyrene, 5-10% of a conjugated diene rubber (e.g. polybutadiene) can be added to the polymerization mixture. In the course of the polymerization, the conjugated diene polymer is grafted onto the polystyrene which results in higher impact properties. The general commercial name for such materials is high impact polystyrene (HIPS). High impact polystyrene is opaque.

Another method of producing impact modified polystyrene is to physically blend polystyrene and a styrene-butadiene-styrene (SBS) block copolymer elastomer. Styrene-butadiene-styrene (SBS) block copolymer is typically produced anionically then physically blended with styrene in an extruder in a range of from about 25% to 75% SBS. The general commercial name for the blend is transparent impact polystyrene (TIPS). One primary disadvantage for blending polymers to form TIPS is cost, as it requires the separate manufacture of polystyrene and a rubber material followed by granulation and processing. Acrylic polymers of low Tg (glass transition temperature), like polyethylhexyl and polybutyl acrylate, are rubbery in nature. However, physical blends of acrylic polymers such as polybutyl acrylate and polystyrene are not compatible.

U.S. Pat. No. 5,721,320 discloses a free radical bulk polymerization process for producing a rubber modified vinyl aromatic comprising polymerizing the vinyl aromatic in the presence of a diene rubber having at least one stable free radical group under polymerization conditions such that a vinyl aromatic-diene block and/or graft copolymer rubber is formed. This patent does not disclose the use of acrylic initiators.

U.S. Pat. No. 5,627,248 discloses a living free radical polymerization process for vinyl aromatic monomers, which employs a difunctional nitroxyl initiator. The dinitroxide compounds described in the patent comprise TEMPO or TEMPO-based derivatives. This class of free radical control agent does not provide control over acrylic type monomers. Specifically, the use of methacrylics will lead to side and termination reactions such as disproportionation, which inhibits the formation of block copolymers and long chain molecules (as described by Ananchenko et. al. in the *Journal of Polymer Science: Part A: Polymer Chemistry*, Vol. 40 pp 3264-3283). Therefore dinitroxyl acrylic based macroinitiators cannot be produced directly from dinitroxides such as TEMPO and TEMPO-based alkoxyamines. Such are not suited to the controlled polymerization of acrylics. The other methods described in U.S. Pat. No. 5,627,248 for forming telechelic dinitroxyl macroinitiators are plagued by inefficiency, i.e., while some fraction of telechelic materials will form, another fraction will contain only mono-nitroxide functionality and in some cases a fraction of the polymer will have no nitroxide functionality. For example, the formation of telechelic macroinitiators starting from dinitroxyl azo, sulfide or peroxide compounds are described. This method relies on termination via chain coupling to produce a telechelic macroinitiator. According to Odian, G.; in *Principles of Polymerization*, Fourth Edition, John Wiley & Sons, Inc., 2004, approximately 10% of peroxide termination occurs via disproportionation and chain transfer. This would lead to a yield of less than 85% of the described dinitroxide comprising TEMPO or TEMPO-based derivatives. The macroinitiators of the present invention yield much greater than 85% dinitroxide owing to the fact that peroxide moieties are not required.

U.S. Pat. No. 6,255,402 discloses a process for preparing a vinyl aromatic polymer matrix and particles of rubber by polymerizing a vinyl aromatic in the presence of a rubber comprising a group which generates a stable free radical. The introduction of a poly(meth)acrylate macroinitiator into a standard polystyrene process is not disclosed in the above patent.

SUMMARY OF THE INVENTION

Figure 1:
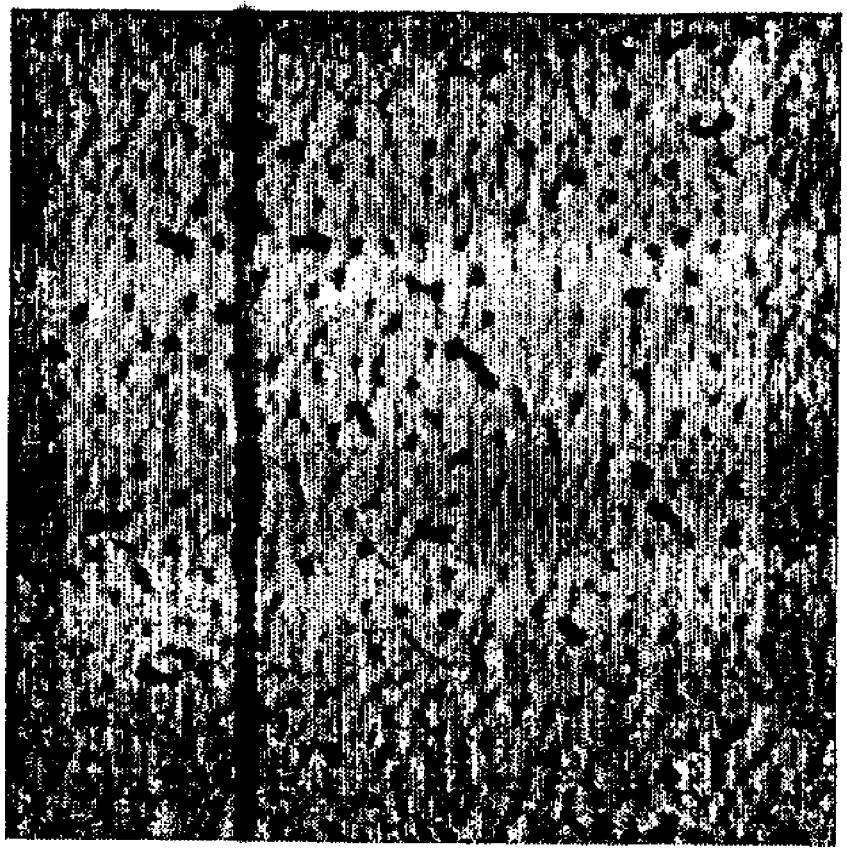
FIG. 1 is an Atomic Force Microscopy (AFM) image, (scale: 2 microns by 2 microns), of polystyrene copolymer material prepared as described in Example 1.

As described in the previous section there are many types of polystyrene and polystyrene containing polymers, including but not limited to; General Purpose Polystyrene (GPPS), Expandable Polystyrene (EPS), Oriented Polystyrene (OPS) and Unsaturated Polyester Resin (UPR). There exists a need for facile methods to modify polystyrene resin and composite materials containing polystyrene. We have found the introduction of (meth)acrylic macroinitiators to the synthesis processes of these materials leads to a wide range of beneficial properties. These properties can be controlled based upon the macroinitiator chosen and they can include improved mechanical, rheological, thermal, and physical properties including, but not limited to elongation, impact, transparency, compatibility, thermal stability, surface modification, paintability, reduced shrinkage, toughening, resistance to cracking, and processability. The composite materials themselves can function as a grade of impact modified or toughened polystyrene. These (meth)acrylic macroinitiators are reactive, and become chemically bound to the polymer or composite matrix, thereby preventing the macroinitiator from macro-phase separating or migrating out of the matrix. Furthermore, these composite materials can be used as surfactants, process aids, compatibilizers, low profile additives, impact modifiers, polymerization initiators or free-radical sources, crosslinking agents and in a number of other applications that will be evident to those skilled in the art.

The present invention relates to the use of poly(meth) acrylic macroinitiators in the polymerization of vinyl aromatic monomers to improve the properties of the resulting modified-composite material. As used herein, modified-composite material refers to material formed when polymerizing vinyl aromatics in the presence of the poly (meth)acrylic macroinitiators, with or without additional components. More particularly, the present invention relates to the use of poly(meth)acrylic macroinitiators having nitroxyl end groups as the sole initiator or in combination with conventional initiators in the polymerization of vinyl aromatics. The macroinitiators preferably have two or more nitroxyl end groups. However, the presence of macroinitiators having a single nitroxyl end group is within the scope of the present invention. Using such macroinitiators in the polymerization of vinyl aromatics such as styrene leads to the in situ formation of acrylic containing copolymers. Depending on the pre-reaction components of the targeted modified-composite material, the copolymers formed can be block copolymers, graft copolymers, a crosslinked composite material, or other such copolymers as will be evident to those skilled in the art. In the case of graft copolymers or crosslinked composite materials, the macroinitiators will comprise distinct segments of the resultant polymeric material. The resulting copolymers can compatibilize the acrylic polymer in the vinyl aromatic matrix thereby improving the resulting polymer properties.

When a low Tg (glass transition temperature) acrylic polymer having nitroxyl end groups is used as a macroinitiator in the polymerization of polystyrene in accordance with the present invention, the resulting polymer composite is an impact modified polystyrene. The impact modified polystyrene may be transparent. When an acrylic polymer having nitroxyl end group(s) is used as a macro-initiator with unsaturated polyester resins and other additives, such as fillers, low profile additive and the like, a modified unsaturated polyester resin composite is formed as will be evident to those skilled in the art.

DETAILED DESCRIPTION

The present invention is directed to the polymerization of vinyl aromatic monomers with an initiator or initiators, which include a macroinitiator comprising (meth)acrylic monomer units (hereinafter referred to as acrylic monomers) having nitroxyl end group(s) and use of such macroinitiators. The (meth)acrylic macroinitiator initiates the vinyl aromatic monomers via the reactive nitroxyl end groups which results in the formation of a vinyl aromatic copolymer. The copolymer formation can lead to compatibilization of the macroinitiator with the resulting aromatic polymer resulting in a composite material having improved mechanical and physical properties such as impact resistance. In many cases, the improved compatibility can lead to transparency. The polymerization can be carried out in a continuous, suspension, emulsion, composite molding, solution, or batch-wise fashion. The macroinitiator can be introduced directly into standard polystyrene reactors to produce modified GPPS, EPS, OPS, or UPR and allow for the in situ formation of (meth) acrylic-b-polystyrene block copolymers.

By acrylic macroinitiator, as used herein, is meant that at least one monomer unit of the macroinitiator segment or block is an acrylic monomer. The acrylic macroinitiator may contain only one type of acrylic monomer repeat units or a combination or combination of two types of acrylic monomer units, or a combination or mixture of greater than two acrylic monomer units or any combination or mixture of acrylic and non acrylic monomers. In one preferred embodiment, the macroinitiator contains 100 percent acrylic monomer units. However, other non-acrylic monomers may be present. By "acrylic" as used herein is meant polymers or copolymers formed from acrylic monomers including, but not limited to, acrylic acids, esters of acrylic acids, acrylic amides, and acrylonitriles. It also includes alkacryl derivatives, and especially methacryl derivatives. The use of the term "(meth) acrylic" herein will be used to describe both esters of acrylic acid and methacrylic acid as will be evident to those skilled in the art. Functional and fluorinated (meth)acrylate monomers are also included. Examples of useful acrylic monomers include, but are not limited to acrylic acid; methacrylic acid; alkyl esters and mixed esters of (meth)acrylic acid; acrylamide; methacrylamide; N- and N,N-substituted (meth)acrylamides; maleic acid, fumaric acid, crotonic acid, itaconic acid and their corresponding anhydrides; carbonyl halides; amides, amidic acids, amidic esters, and the full and partial esters thereof, and mixtures thereof. Preferred acrylic monomers include methyl acrylate, ethyl acrylate, butyl acrylate, and $C_6$-$C_{30}$ alkyl(meth)acrylates, acrylic acid, and mixtures thereof. Especially preferred is butyl acrylate.

The other monomers of the macroinitiator may be one or more other acrylic monomer unit, or formed from one or more non-acrylic ethylenically unsaturated monomer units. Other ethylenically unsaturated monomers useful in the invention include, but are not limited to, anhydrides, acrylonitriles, vinyl esters, alpha-olefins, dienes, substituted or unsubstituted mono and dialkyl esters of unsaturated dicarboxylic acids, vinyl aromatics, substituted vinyl aromatics, cyclic monomers, monomers containing alkoxylated side chains, sulfonated monomers, and vinyl amide monomers.

Suitable vinyl aromatic monomers in accordance with the present invention are typically represented by the formula:

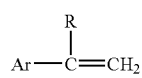

Formula I wherein R is hydrogen or methyl, Ar an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl with phenyl being most preferred. Typical vinyl aromatic monomers which can be used include: styrene; alpha-methylstyrene; all isomers of vinyl toluene, especially para-vinyltoluene; all isomers of ethyl styrene, propyl styrene, vinyl biphenyl, vinyl naphthalene, vinyl anthracene and the like, and mixtures thereof. Styrene is the preferred vinyl aromatic. The vinyl aromatic monomers may also be combined with other copolymerizable monomers. Examples of such monomers include but are not limited to acrylic monomers such as acrylic acid; methacrylic acid; alkyl esters and mixed esters of (meth)acrylic acid, acrylonitrile, methacrylonitrile, maleic anhydride, maleimide, di-olefins and phenylmaleimide methyl methacrylate, butyl acrylate, methyl acrylate, phenylmaleimide, dienes and mixtures thereof. The vinyl aromatic monomers may also be combined with other reactive polymers. Examples of such other reactive polymers include but are not limited to unsaturated polyester resins, such as: isophthalic resins; dicyclopentadiene resins, epoxy dimethacrylate resins, terephthalate resins, phthalic resins, vinyl ester resins, epoxy resins, and halogenated resins.

Especially useful macroinitiators in the present invention include (meth)acrylic polymers of low glass transition temperature (Tg) having nitroxyl end group(s). Examples of such macroinitiators include but are not limited to butyl acrylate, ethyl acrylate, methyl acrylate, $C_6$-$C_{30}$ alkyl(meth)acrylate and copolymers of the aforementioned with acrylic acid. The nitroxyl end groups can be monofunctional, difunctional or multifunctional or mixtures thereof. The macroinitiator functionality depends upon the functionality of the starting initiator fragment used, such as, triethylene glycol diacrylate, dipropylene glycol diacrylate, trimethylolpropane triacrylate, pentaerythritol tetraacrylate, and dipentaerythritol pentaacrylate. Exemplary nitroxides are described in US application 2005/0107577. The preferred method for macroinitiator preparation of the present invention is nitroxide-mediated controlled radical polymerization (NM-CRP). Nitroxide-mediated syntheses can occur in bulk, solvent, and aqueous polymerization and can be performed in existing equipment at reaction times and temperature similar to other free radical polymerizations. One advantage of NM-CRP is that the nitroxide is generally innocuous and can remain in the reaction mix, while other CRP techniques require the removal of the control compounds and/or toxic by-products from the final polymer.

The mechanism for this control may be represented diagrammatically as below:

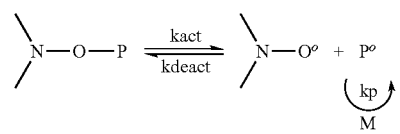

with M representing a polymerizable monomer and P representing the growing polymer chain.

The key to the control is associated with the constants $k_{deact}$, $k_{act}$ and $k_p$ (T. Fukuda and A. Goto, Macromolecules 1999, 32, pages 618 to 623). If the ratio $k_{deact}/k_{act}$ is too high, the polymerization is blocked, whereas when the ratio $k_p/k_{deact}$ is too high or when the ratio $k_{deact}/k_{act}$ is too low, the polymerization is uncontrolled.

It has been found (P. Tordo et al., Polym. Prep. 1997, 38, pages 729 and 730; and C. J. Hawker et al., Polym. mater. Sci. Eng., 1999, 80, pages 90 and 91) that β-substituted alkoxyamines make it possible to initiate and control efficiently the polymerization of several types of monomers, whereas TEMPO-based alkoxyamines [such as (2',2',6',6'-tetramethyl-1'-piperidyloxy-)methylbenzene mentioned in Macromolecules 1996, 29, pages 5245-5254] control only the polymerizations of styrene and styrenic derivatives. TEMPO and TEMPO-based alkoxyamines are not suited to the controlled polymerization of acrylics.

Nitroxide-mediated CRP processes are described in U.S. Pat. No. 6,255,448; US Published Application No. 2002/0040117; EP 1,178,955; and WO 00/71501 incorporated herein by reference. The above references describe nitroxide-mediated polymerization by a variety of processes. Each of these processes can be used to synthesize polymers described in the present invention. The preferred method for preparing nitroxyl-functionalized macroinitiators is disclosed in US Published Application No. 2005/0107577.

In one nitroxide-mediated process, the free radical polymerization or copolymerization is carried-out under the usual conditions for the monomer or monomers under consideration, as known to those skilled in the art, with the difference being that a β-substituted stable free radical macroinitiator is added to the mixture. Depending on the monomer or monomers which it is desired to polymerize, it may be necessary to introduce a traditional free radical initiator into the polymerization mixture as will be evident to those skilled in the art.

In another nitroxide-mediated process the polymerization of the monomer or monomers is carried out using an alkoxyamine obtained from β-substituted nitroxides of formula (II), alone or in combination with a traditional free radical initiator, wherein A represents a mono or polyvalent structure and $R_L$ represents a mole weight of more than 15 and is a monovalent radical, and $n \geq 1$.

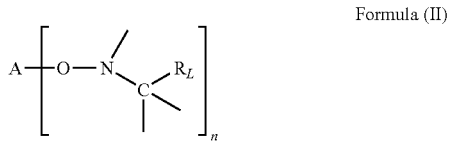

Formula (II)

In another nitroxide-mediated process the formation of polyvalent alkoxyamines of formula (II) is carried out based on the reaction of multifunctional monomers, such as, but not limited to, acrylate monomers and alkoxyamines at controlled temperatures. The multifunctional alkoxyamines of formula (II), wherein $n \geq 2$, may then be utilized to synthesize multiblock, star and branched polymeric and copolymeric materials from the monomer or monomers under consideration.

In another nitroxide-mediated process the preparation of multimodal polymers is carried out where at least one of the monomers under consideration is subjected to free radical polymerization in the presence of several alkoxyamines comprising the sequence of formula (II), wherein n is a non-zero integer and the alkoxyamines exhibit different values of n.

The alkoxyamines and nitroxyls (which nitroxyls may also be prepared by known methods separately from the corresponding alkoxyamine) as described above are well known in the art. Their synthesis is described for example in U.S. Pat. No. 6,255,448; EP 1178995 and WO 00/40526.

The preferred nitroxide radical is a β-phosphorous nitroxide radical of the general formula:

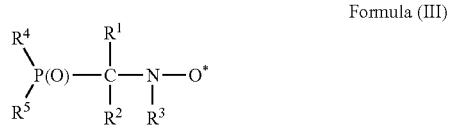

Formula (III)

in which $R^1$ and $R^2$, which are identical or different, represent a hydrogen atom, a linear, branched or cyclic alkyl radical having a number of carbon atoms ranging from 1 to 10, an aryl radical, or an aralkyl radical having a number of carbon atoms ranging from 1 to 10, or else $R^1$ and $R^2$ are connected to one another so as to form a ring which includes the carbon atom carrying said $R^1$ and $R^2$, said ring having a number of carbon atoms, including the carbon carrying the $R^1$ and $R^2$ radicals, ranging from 3 to 8; $R^3$ represents a linear or branched and saturated or unsaturated hydrocarbonaceous radical which can comprise at least one ring, said radical having a number of carbon atoms ranging from 1 to 30; and $R^4$ and $R^5$, which are identical or different, represent a linear or branched alkyl radical having a number of carbon atoms ranging from 1 to 20 or a cycloalkyl, aryl, alkoxyl, aryloxyl, aralkyloxyl, perfluoroalkyl, aralkyl, dialkyl- or diarylamino, alkylarylamino or thioalkyl radical, or else $R^4$ and $R^5$ are connected to one another so as to form a heterocycle which includes the phosphorus atom, said heterocycle having a number of carbon atoms ranging from 2 to 4 and may further comprise one or more oxygen, sulfur or nitrogen atoms. Methods of preparing such β-phosphorous nitroxide radicals are disclosed in U.S. Pat. No. 6,624,322, the disclosure of which is incorporated herein by reference.

A preferred macroinitiator is a low Tg acrylic polymer having as end group(s), the β-phosphorous nitroxide radical of formula III. At temperatures less than about 80° C., the β-phosphorous nitroxide radical forms a stable covalent bond. Thus, at room temperature, the material has a long shelf life. When the β-phosphorous nitroxide radical capped (meth)acrylic polymer is heated to temperatures above about 90° C., the β-phosphorous nitroxide radical readily disassociates forming a free radical (meth)acrylic polymer. When a mixture of the β-phosphorous nitroxide radical capped (meth)acrylic polymer and a vinyl aromatic monomer mixture is so heated, the disassociated free radical acrylic polymer acts as an initiator and polymerizes with the vinyl aromatic monomer. This leads to copolymer formation in which the resultant poly(meth)acrylic segment is compatibilized in the vinyl aromatic polymer matrix. A conventional polymerization initiator can be combined with the β-phosphorous nitroxide radical capped acrylic polymer of the present invention. The resulting vinyl aromatic material is thus modified with the (meth)acrylic polymer. When the vinyl aromatic is styrene, "rubber" modified polystyrene is produced. The "rubber" modified polystyrene exhibits improved impact resistance and can be transparent. When transparent, transparent impact modified polystyrene is formed. The modified vinyl aromatic can be produced directly in a bulk, batch-wise, suspension, solution, composite molding or continuous process and no physical blending is required.

When the poly(meth)acrylic macroinitiator of the present invention contains more than one monomeric repeating units, they can be arranged in a controlled fashion to form structures such as block copolymers. Included as poly(meth)acrylic macroinitiator block copolymers of the present invention are diblock copolymers, triblock copolymers, multiblock copolymers, star polymers, comb polymers, gradient polymers, and other polymers having a blocky structure, which will be known by those skilled in the art.

When a copolymer segment is synthesized using a CRP technique such as nitroxide-mediated polymerization, it is often termed a gradient or profiled copolymer. This type of copolymer is different than a copolymer obtained by a traditional free radical process. The properties of the copolymer will be dependant on the monomer composition, control agent used, and polymerization conditions. For example, when polymerizing a monomer mix by traditional free radical polymerizations, a statistical copolymer is produced, as the composition of the monomer mix remains static over the lifetime of the growing chain (approximately 1 second). Furthermore, due to the constant production of free radicals throughout the reaction, the composition of the chains will be non-uniform. During a controlled radical polymerization the chains remain active throughout the polymerization (i.e., the monomer mix is not static over the lifetime of the growing chain), thus the composition of the chains is uniform and is dependant on the corresponding monomer mix with respect to the reaction time.

An example of a gradient block copolymer is when the monomer or monomers used from one segment are allowed to further react as a minor component in the next sequential segment. For example, if the monomer mix used for the $1^{st}$ block (A block) of an AB diblock copolymer is polymerized to only 80% conversion, then the remaining 20% of the unreacted monomer is allowed to react with the new monomers added for the B block segment the result is an AB diblock copolymer in which the B segment contains a gradient of the A segment composition. In the preceding example, if a difunctional initiation source is used, a BAB type triblock copolymer will be formed where the B segments contains a gradient of the A segment.

The poly(meth)acrylic macroinitiator of the present invention can be added to the system in an amount selected to provide the desired degree of modification to the vinyl aromatic matrix. Preferably between about 0.1 and 80% by weight of the (methyl)acrylic macroinitiator, more preferably between about 0.5 to 30% by weight, most preferably between about 1.0 to 20% by weight. The poly(meth)acrylic macroinitiator can be provided neat or in a diluent such as butyl acetate, toluene, ethylbenzene, methyl ethyl ketone, dioxane, tetrahydrofuran, acetone, styrene, butyl acrylate, methyl methylacrylate, and other (meth)acrylic monomers.

The addition of the poly(meth)acrylic macroinitiator of the present invention to unsaturated polyester resin (UPR) composites can offer many desirable properties. One such desirable property is toughening. UPR composites are generally considered to be brittle materials and the introduction of the (meth)acrylic macroinitiator in UPR composite fabrication produces a toughened modified-composite material. Another advantage realized from the reactive nature of the macroinitiator is that during the composite formation it becomes covalently bound to the composite matrix and therefore will not leach or migrate from the final product. It is often favorable when the entire macroinitiator has a low Tg, or in the case of a block copolymer macroinitiator, when at least one of the segments has a low Tg. Advantages to reducing the brittleness of UPR composites include, improved physical and mechanical properties of the UPR composite, for example a reduction of micro-cracking on the surface.

It has also been found that the macroinitiator of the current invention can serve multiple functions within a UPR composite. Aside from toughening, the macroinitiator of the current invention has also been shown to either partially or completely replace low profile additives. Therefore one material may be added to a UPR formulation and serve two purposes, i.e., impart low profile and toughening advantages. Other aspects which the macroinitiators of the current invention can also improve include, but are not limited to, surface properties, such as paintability or gloss, pigment dispersion, part shrinkage, etc. The macroinitiators can partially or completely replace traditional free radical sources used for UPR cure, such as peroxides or azonitrile compounds. Furthermore, macroinitiators of the current invention, with a functionality of 3 or more, can act as multi-functional crosslinking agents, by contributing to the three dimensional crosslinked network of such unsaturated polyester formulations.

An advantage of the copolymers of the present invention compared with existing TIPS relates to its fluidity. Once melted, the product of the invention shows very interesting rheological behavior: (1) at low shear rates, because of the presence of the PS block and the poly(meth)acrylic block the product of the present invention does not exhibit a Newtonian behavior (for a Newtonian fluid, the viscosity does not change with the shear rate) but a pseudo-plastic behavior (the viscosity increases when the shear rate decreases). The product of the present invention turns out to be more viscous than a traditional PS of the same molecular weight or even of a blend of GPPS with SBS and (2) at high shear rates, the product of the present invention turns out to be more fluid than a traditional PS of the same molecular weight or even of a blend of GPPS with SBS. Thus, the product of the invention has the advantage of having a lower viscosity at high shear rates, which is an advantage in processing (less energy consumption, better injectability, lower cycle time). This is correlated with a higher melt strength of the product of the invention compared with products of the same viscosity at high shear rates. Due to its behavior at low shear rates, the product of the present invention also has advantages in applications where elasticity at low shear rates is required such as foam applications.

Another advantage of the product of the present invention is enhanced thermal stability. It is known that HIPS and TIPS are used in compounding with technical polymers such as PPE (polyphenylene ether), which are processed at very high temperatures (280° to 320° C.). In this temperature range, the polybutadiene is not very stable and cross-links, reducing the impact performance of the product. Very often when the toughness of the formulation is not good enough, it is common to add a copolymer such as SBS or, more frequently SEBS to increase the performance of the blend. SEBS is preferably used because its thermal stability is better than SBS, even if the impact performances and economics are compromised. Owing to the excellent thermal stability of, for example, polybutyl acrylate, the product of the present invention can be processed in such applications without reducing the impact properties of the final product. This eliminates the need of using multiple additives to improve the behavior of the final product (and improves economics). Additionally, this is another field where the higher fluidity at high shear rates of the product of the present invention will improve the property balance of the final product formulation. Alternatively, the product of the present invention could also be used as the copolymer added in the compound to improve the impact performance in place of the SEBS.

Another advantage of the product of the present invention is enhanced UV aging properties. The living poly(meth)acrylic macroinitiators used in the present invention have a much higher UV stability than the polybutadiene used in HIPS or TIPS or, even of pure PS. Thus, the product of the present invention will have a longer life time in applications where the product has to cope with the effect of UV exposure (outdoor applications or indoor applications where UV exposure is prevalent).

The present invention will now be described with reference to a number of specific examples, which are not intended to be limiting.

EXAMPLES

Example 1

In Example 1, polymerizations of a styrene monomer using living poly(meth)acrylic macroinitiators of the present invention were carried out in a continuous micropilot apparatus which included a feed tank, a first reactor and a second reactor. The efficacy of the living poly(meth)acrylic macroinitiators of the present invention were compared to a conventional General Purpose Polystyrene (GPPS) resin. Combinations of the living poly(meth)acrylic macroinitiators of the present invention and conventional peroxide initiators were also analysed.

Living polybutyl acrylate macroinitiators of varying molecular weights comprising polybutyl acrylate capped with β-phosphorous nitroxide radicals were prepared as disclosed in US Published Application No. 2005/0107577 incorporated herein by reference. The specifications of the living polybutyl acrylate macroinitiators in a toluene solution are summarized in Table 1.

TABLE 1

| Sample | Assay | Mw | Mn |
|---|---|---|---|
| 1 | 52% | 59,760 | 40,310 |
| 2 | 46% | 77,630 | 45,920 |

Testing in a continuous micropilot polymerization apparatus was undertaken which comprised charging the feed tank with a styrene/living poly(butyl acrylate) macroinitiator solution. If a conventional peroxide was also used, it was blended with the solution before being placed in the feed tank. The blend from the feed tank was fed to the first reactor. The temperature of the first reactor was varied dependant upon the half-life of the peroxide used as would be evident to those skilled in the art. In the tests, Luperox® 331, Luperox® JWEB and Luperox® TAEC available from Arkema Inc. of Philadelphia, Pa. were employed. When no peroxide was used, the temperature was 120° C. The temperature in the second reactor was graduated in zones from 135° to 150° C. A batch reaction was performed until 25-30% solids were obtained, before continuous polymerization was started. After steady state in the continuous polymerization was reached, copolymer material was collected for testing. The copolymer samples were tested for molecular weight, residual styrene, and melt flow index. Sample test bars were prepared by injection molding and displacement was measured (elongation was calculated from displacement). Both tensile and 3-point bend tests showed increased elongations for styrene/living polybutyl acrylate composite material in accordance with the present invention as compared to pure PS.

Materials prepared with representative polybutyl acrylate macroinitiators of the present invention (samples 1 and 2, Table 1) resulted in a transparent polymer with slightly better elongation than traditional GPPS prepared using a traditional initiator system. When the living polybutyl acrylate macroinitiators of the present invention were used, polystyrene-polybutyl acrylate block copolymers were produced in-situ and they subsequently exhibited a nanoscale morphology of polybutyl acrylate rubber domains dispersed in a polystyrene matrix (see FIG. 1). This morphology resulted in a transparent polystyrene composite with enhanced physical properties. The dark regions in FIG. 1 are polybutyl acrylate rubber domains.

The prepared samples were tested using an Instron Corporation Series IX Automated Materials Testing System with a crosshead speed of 0.2 inches/minute. A sample of commercially prepared GPPS was also tested using the above conditions. The commercial sample tested showed 0% elongation. Table 2 summarizes the results and shows the material prepared using 6-12% of the living polybutyl acrylate macroinitiators of the present invention had a significant improvement in elongation as values between 2-3% were observed. Material prepared using 1% living polybutyl acrylate macroinitiators showed elongation measurements similar to commercial GPPS.

Tensile measurements were also performed at high strain rates (0.45 m/s). The samples prepared with the living polybutyl acrylate macroinitiators of the present invention were also compared to a polystyrene grade called 1540 (PS Clear available from Total Petrochemicals). In these tests, the 1540 grade had a 3.2% elongation while the samples initiated with the 6-12 wt % living polybutyl acrylate macroinitiator of the present invention showed elongations between 3.7 and 4.2%, a 15-30% increase in elongation.

TABLE 2

|  | PS-1 | PS-2 | PS-3 | PS-4 | PS-5 |
|---|---|---|---|---|---|
| Styrene (%) | 88 | 88 | 88 | 76 | 88 |
| Macroinitiator (%) | 6 | 6 | 6 | 12 | 6 |
| Macroinitiator Sample No. | 1 | 2 | 2 | 2 | 2 |
| Toluene (%) | 6 | 6 | 6 | 12 | 6 |
| Initiator (Luperox ®) | 331 | JWEB | JWEB | None | TAEC |
| Initiator Loading (ppm) | 169 | 250 | 500 | — | 250 |
| Mw (000) | 228 | 305 | 296 | 244 | 276 |
| Mn (000) | 73 | 97 | 81 | 61 | 90 |
| Mw/Mn | 3.1 | 3.2 | 3.6 | 4.0 | 3.1 |
| Residual Styrene (%) | 0.069 | 0.12 | 0.28 | 0.033 | 1.3 |
| Melt Flow Index (MFI) | 3.7 | 1.7 | 2.3 | 4.3 | 3.7 |
| Displacement (mm) | NE | 4.653 | 4.536 | 4.953 | 4.308 |
| Elongation (%) | NE | 2.8 | 2.7 | 3.0 | 2.6 |

Luperox ® initiators are available form Arkema Inc. of Philadelphia, PA

Example 2

A polymerization to prepare Expandable Polystyrene (EPS) was run. A 3% solution of living polybutyl acrylate macroinitiator (sample 2, Table 1) in styrene was prepared. The styrene solution was polymerized in a 1-liter jacketed reactor with an equivalent volume of water containing 7500 ppm tricalcium phosphate and 15 ppm potassium persulfate (all loadings are weight percent based on styrene). The peroxides used were 1-(t-amylperoxy)-1-methoxy cyclohexane and Luperox® TAEC (Luperox® TAEC available from Arkema, Inc of Philadelphia, Pa.). The suspension polymerization was run for 3 hours at 112° C. and 2 hours at 115° C. As the temperature was increased to 115° C., 40 ppm sodium dodecylbenzenesulfonate was added. The reactor was cooled and molecular weight analysis on the resulting polymer showed a Mw of 247,500. This is similar to traditional EPS with no macroinitiator added.

Example 3

Figure 2:
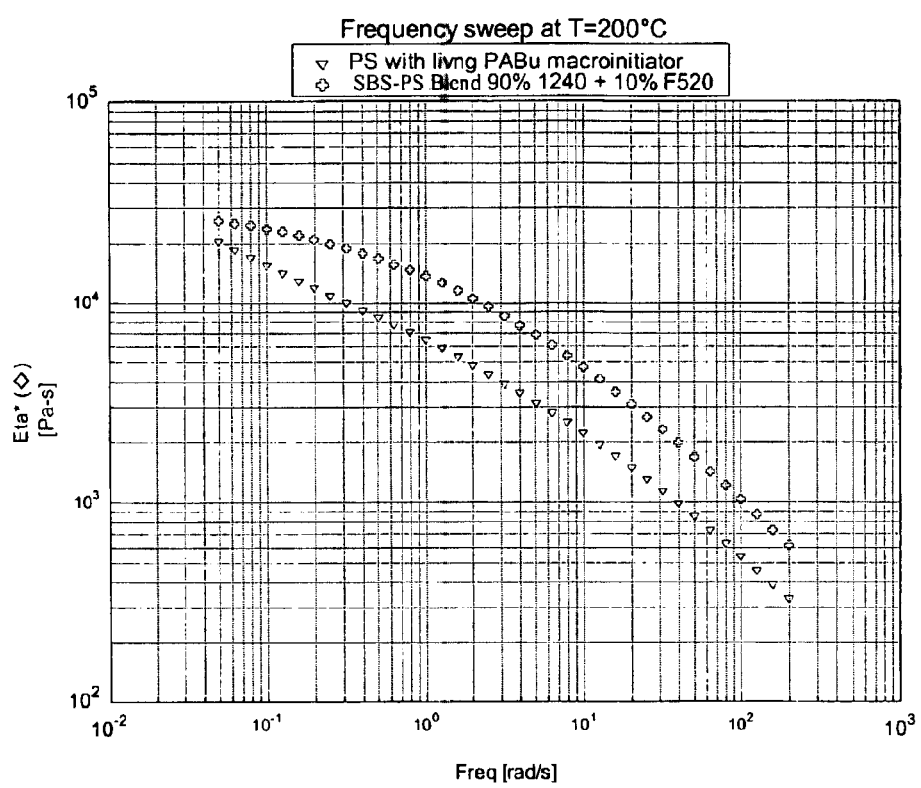
FIG. 2 is a plot of viscosity (pascal second) versus shear frequency (radian/seconds) for the materials described in Example 3.
Figure 3:
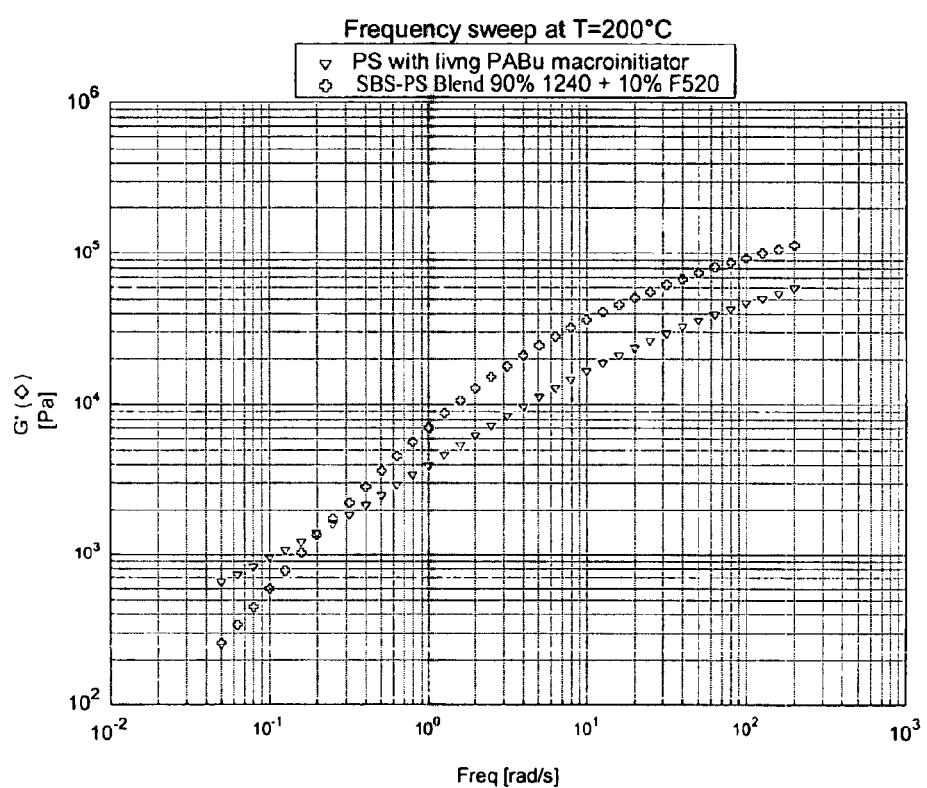
FIG. 3 is a plot of shear elastic modulus (Pascals) versus shear frequency (radian/seconds) for the materials described in Example 3.

Shear Elastic Modulus and Viscosity versus Shear Frequency was measured for: a blend of 90% PS 1240 (GPPS from Total Petrochemicals) and 10% F520 (an SBS block copolymer from Total Petrochemicals), and a PS copolymer material of the present invention. FIGS. 2 and 3 represent the evolution of n* and G', versus the shear frequency at 200° C. The measurements were done in plate/plate 25 mm geometry on a Rheometrics RDA II. FIGS. 2 and 3 show the product of the present invention has the advantage of having a lower viscosity at high shear rates which is advantageous in processing (less energy consumption, better injectability, lower cycle time).

Example 4

Melt Strength measurements for 1450 (GPPS), 1540 (GPPS) and PS copolymer material of the present invention were done on a Rosand RH7 capillary rheometer at 200° C. The melt strength test conditions were the following Die: L=20 mm and D=2 mm.

Shear rate: 50 s-1 (the corresponding piston speed: 13.33 mm/min)

Gap: 150 mm

Stretching from 0 to 300 m/min (maximum speed) with an acceleration of 1 m/min/s.

Stretching was started after a 7 min preheating at 200° C.

At least three tests were carried out for each product.

Figure 4:
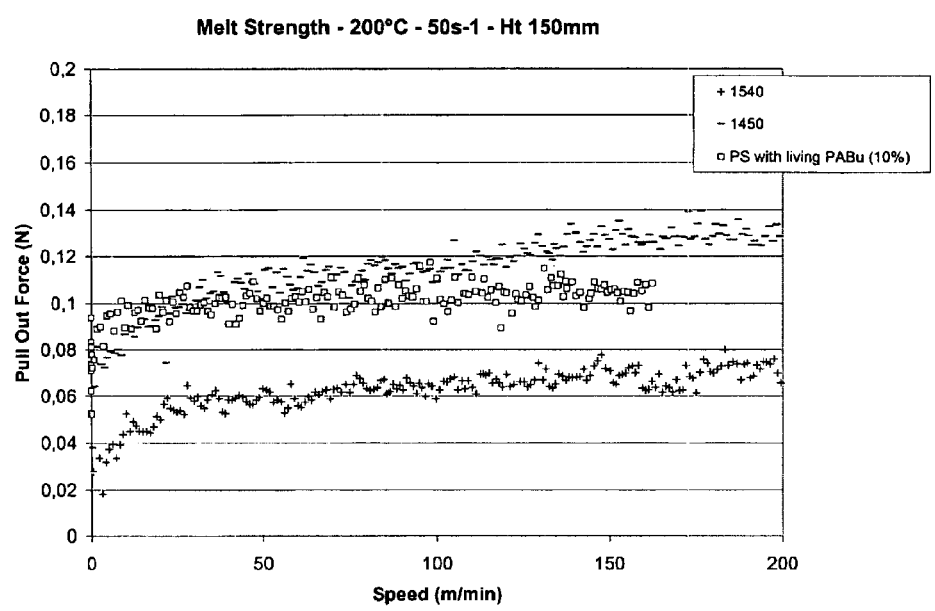
FIG. 4 is a plot of pull out force (newtons) versus speed (meters/minute) showing melt strength at 200° C. for 1450 (GPPS), 1540 (GPPS), and a PS copolymer material of the present invention.

The data in Table 3 and FIG. 4 shows that the product of the present invention demonstrates a higher fluidity at high shear rate combined with a high melt-strength thanks to its rheological behavior at low shear rates.

TABLE 3

|  | Eta 0.1 rad · s-1 | Eta 200 rad, s-1 | Force at Break (N) |
|---|---|---|---|
| 1450 | 7810 | 494 | 0.13 |
| 1540 (PS clear) | 5093 | 377 | 0.07 |
| PS with living PABu | 15463 | 332 | 0.10 |

Example 5

Figure 5:
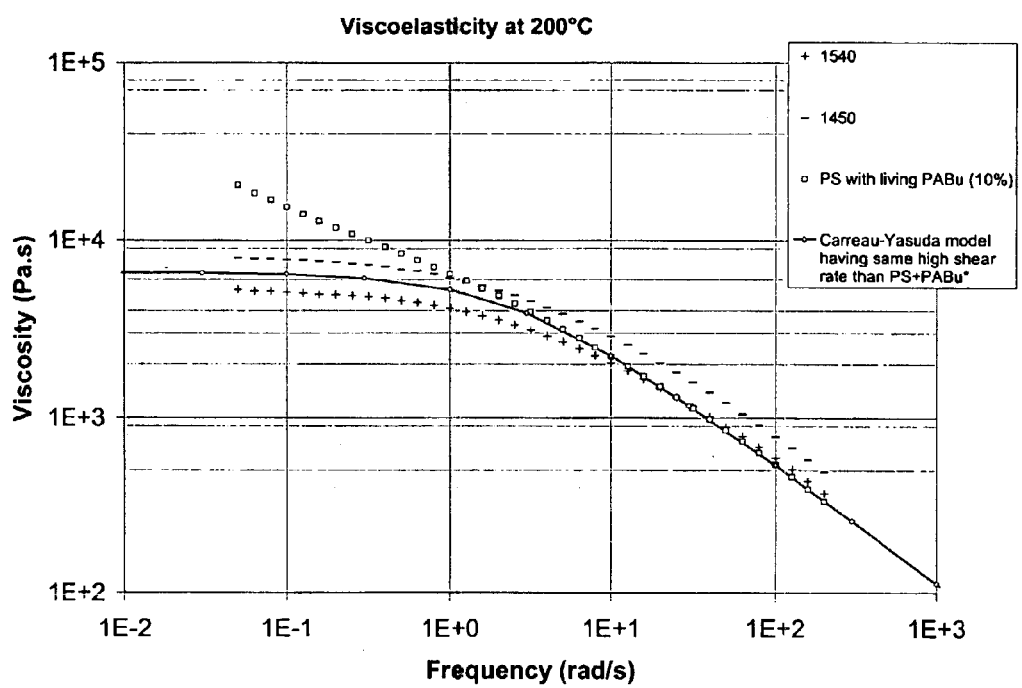
FIG. 5 is a plot of viscosity (pascal second) versus shear frequency (radian/seconds) showing viscoelasticity at 200° C. for 1450 (GPPS), 1540 (GPPS) and a PS block copolymer of the present invention.

The high shear rate data of the product of the present invention was used to model its behavior at low shear rate based upon a classic Carreau-Yasuda model (using the data from 6.28 rad·s-1 to 200 rad·s-1). FIG. 5 illustrates the results and shows the importance of the increase of viscosity at low shear rates compared with the behavior of 1540 (GPPS) and 1450 (GPPS).

Example 6

Figure 6:
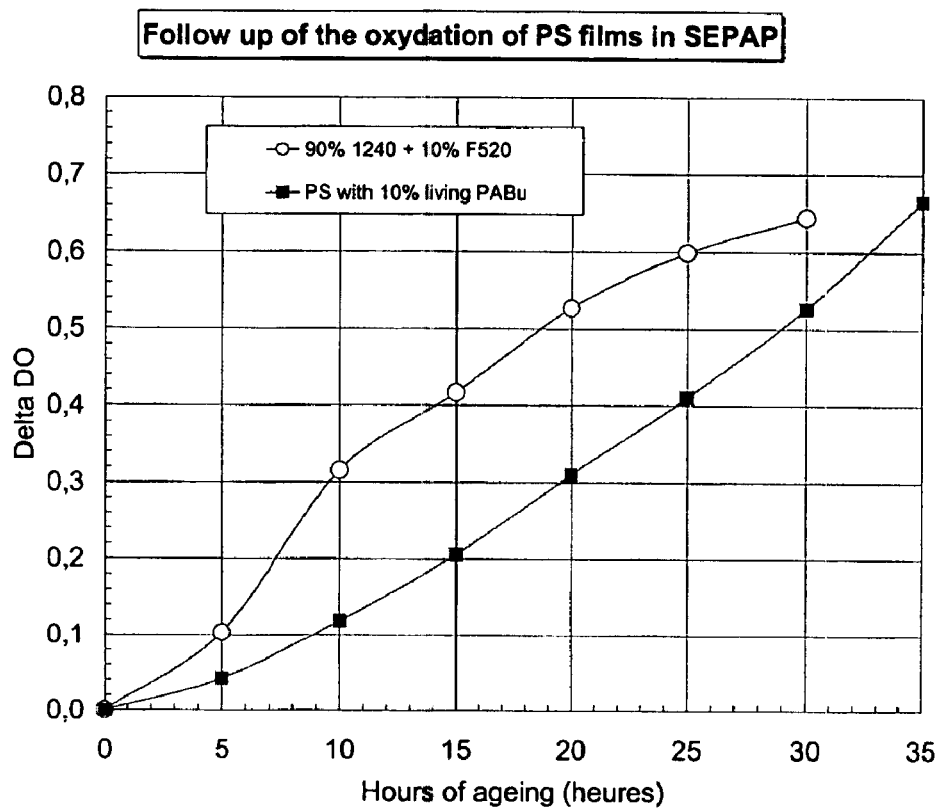
FIG. 6 is a plot of delta DO versus hours showing accelerated aging effects on a physical blend of 90% 1240 (GPPS)+ 10% F520 (SBS block copolymer) and a PS copolymer material of the present invention.

Heat aging of a blend of PS and SBS and of a product of the present invention (PS made with 10% living polybutyl acrylate macroinitiator) was carried out in a SEPAP test chamber (Hg lamp). The aging of the samples was monitored by FTIR. The changes in absorption at 1715 cm$^{-1}$ were monitored by comparing the value after X hours of aging to the initial value. The difference was called Delta DO. The higher Delta DO, the stronger the aging effect. FIG. 6 shows that the unfavorable aging of a product of the present invention is only half that of a blend of 1240 (GPPS) and F520 (SBS block copolymer). After 30 hours, the mechanical properties of the PS/SBS blend were so weak that the film broke. Thus, there is no 35-hour measurement for the blend film.

Example 7

The preparation of a difunctional polybutyl acrylate latex and corresponding modified composite material latex by controlled radical polymerization was undertaken in a 2 steps process.

Step 1a: Seed Latex

In a 2 L reactor, an aqueous emulsion of the monomer was prepared by mixing butyl acrylate (6.6 g, 0.05 mol) with a water phase (500 mL) containing Dowfax 8390 surfactant (3.3 g, 4.01×10$^{-3}$ mol) and NaHCO$_3$ (0.55 g, 6.55×10$^{-3}$ mol). The mixture was deoxygenated by nitrogen bubbling for 20 min and then poured into the reactor, preheated to 120° C. and stirred at 300 rpm. An acidic dialkoxyamine prepared in accordance with the experimental procedure described in EP 1526138—(2.3 g, 2.39×10$^{-3}$ mol), neutralized with an excess (1.60 equiv. with respect to the acidic functions) of a 0.4 M sodium hydroxide solution was introduced into the reactor when the temperature reached 90° C., triggering the beginning of the reaction. Afterward, a 3 bar pressure of nitrogen was applied. After 8 h of polymerization, the reactor was cooled in an ice water bath, and final conversion was determined by gravimetry.

Step 1b: Seeded Emulsion Polymerization

The seed latex prepared in step 1a was heated to 120° C. When the temperature of the mixture reached 90° C., representing the time zero of the reaction, a "one-shot" addition of butyl acrylate (143.4 g, 1.12 mol) was performed and a 3 bar pressure of nitrogen was applied. Samples were periodically withdrawn to monitor the monomer conversion by gravimetry. In a typical experiment 80% of butyl acrylate conversion was reached in a period of 1 h 30 min. The solids content of the obtained difunctional polybutylacrylate macroinitiator latex was about 18%.

Step 2: Preparation of Block Polystyrene/Polybutyl Acrylate/Polystyrene Copolymers To the difunctional living polybutyl acrylate macroinitiator latex of step 1b, a second load of Dowfax® 8390 surfactant (6.2 g, 7.54×10$^{-3}$ mol), 490 g of distilled water, NaHCO$_3$ (0.54 g, 6.43×10$^{-3}$ mol) and styrene (280 g, 2.7 mol) were added at room temperature, and gently stirred for 1 h. Then, the temperature of the reaction mixture was raised to 120° C. and maintained for 6 h. In a typical experiment, about 60% monomer conversion is reached. In order to chase residual monomer, a shot of potassium persulfate (0.25 g, 0.9×10$^{-3}$ mol) in 5 ml of distilled water is added to the reaction mixture. The temperature was raised to 75° C. and maintained for 4 hours. Monomer conversion was greater than 98% and solids content of the final latex was about 30%.

Example 8

Various samples of UPR composite resins with and without (meth)acrylic macroinitiators were prepared and molded. Table 4 below gives examples of the macroinitiators that have been synthesized. These examples are not meant to be limiting as will be evident to those skilled in the art. Both homopolymers and copolymers are possible, as shown in Table 4. Furthermore, macroinitiators comprising block, random, and gradient copolymers have been made to obtain specific properties and different functionalities. Macroinitiators can be tailored to meet specific end-use applications by utilizing different monomer combinations. Table 4 provides examples of acrylic monomers that generate macroinitiators with low glass transition temperatures.

TABLE 4

| Macroinitiator Description | Molecular Weight (kg/mole) |
|---|---|
| Poly(Butyl Acrylate-co - 5% Acrylic acid) | 50 |
| Poly(Butyl Acrylate) | 100 |
| Poly(Methoxy Ethyl Acrylate) | 50 |
| Poly(Butyl Acrylate-co - 5% Acrylic acid) | 80 |
| Poly(Butyl Acrylate-co - 10% Acrylic acid) | 50 |
| Poly(Butyl Acrylate-co - 10% Acrylic acid) | 80 |
| Poly(Butyl Acrylate) | 80 |
| Poly(Butyl Acrylate) | 10 |
| Poly(Butyl Acrylate) | 25 |
| Poly(Butyl Acrylate-co - 10% Dimethyl acrylamide) | 25 |
| Poly(Ethyl Acrylate) | 50 |
| Poly(Methyl Acrylate) | 50 |
| Poly(Methoxy Ethyl Acrylate-co - 5% Acrylic Acid) | 20 |
| Poly(Butyl Acrylate) with Styrene endblocks | — |
| Poly(Butyl Acrylate-co-Styrene) random | 31.5 |
| Poly(Methoxy Ethyl Acrylate) | 30 |

The designation "co" refers to a copolymer of the monomers listed.

Several examples of the resins prepared are listed in Table 5 and Table 7.

TABLE 5

| Ingredient | Control | Sample 1 | Sample 2 |
|---|---|---|---|
| AOC S 903 (polyester resin, Dow Chemicals Inc) | 52 g | 52 g | 52 g |
| LP 40 (poly(vinyl acetate), Ashland Chemicals, Inc.) | 48 g | 48 g | 48 g |
| SP 9139 (inhibitor, Plasticolors) | 2.7 g | 2.7 g | 2.7 g |
| PG 9033 (thickener, Plasticolors) | 2.4 g | 2.4 g | 2.4 g |
| Zn Stearate | 3 g | 3 g | 3 g |
| Ca Carbonate | 160 g | 160 g | 160 g |
| ¼" chopped glass | 40 g | 40 g | 40 g |
| Luperox ® TAEC | 2.8 g | 2.8 g | 2.8 g |
| Polybutyl acrylate Macroinitiator | 0 | 33 g | 0 |
| Polybutyl acrylate/acrylic acid Macroinitiator | 0 | 0 | 33 g |
| Styrene | 16.5 g | 0 | 0 |

Styrene was added to the control due to the styrene diluent in the macroinitiator samples (macroinitiator samples were 50 wt % polymer and 50 wt % styrene). Molding results showed that the macroinitiator did not adversely affect the gel kinetics while imparting additional properties from the macroinitiator. Molding results are shown below and are the average of 5 results.

TABLE 6

| Test | Control | Sample 1 | Sample 2 |
|---|---|---|---|
| Gel Time (sec) | 28.7 | 22.8 | 18.6 |
| Temp at Cure (° F.) | 287.4 | 285.8 | 287.7 |
| Cure Time (sec) | 57.1 | 58.4 | 50.1 |

Table 7 shows four additional UPR formulations. Note that the macroinitiators are diluted in styrene (50%-60%) to facilitate handling. The low profile agent contains 60% styrene monomer. Styrene monomer levels were adjusted to maintain equivalent styrene levels in all five formulations. The weight of macroinitiator is given as a solution in styrene.

TABLE 7

| Ingredient | Description (Manufacturer) | #1 | #2 | #3 | #4 | #5 |
|---|---|---|---|---|---|---|
| AOC S903 | Polyester Resin (AOC) | 47.19 | 47.19 | 47.19 | 47.19 | 47.19 |
| LP 4016 | Low Profile Agent (Ashland) | 43.56 | — | — | — | — |
| PG 9033 | Thickener (Plasticolors) | 2.25 | 2.25 | 2.25 | 2.25 | 2.25 |
| SP 9139 | Inhibitor (Plasticolors) | 2.49 | 2.49 | 2.49 | 2.49 | 2.49 |
| Styrene | Monomer (Aldrich) | 14.97 | 24.83 | 29.14 | 18.48 | 10.37 |
| Synpro D | Zn Stearate (Ferro) | 5.43 | 5.43 | 5.43 | 5.43 | 5.43 |
| Glass Fiber | ¼" Chopped Glass | 36.30 | 36.30 | 36.30 | 36.30 | 36.30 |
| OmyaCarb | $CaCO_3$ (Saint-Gobain) | 145.23 | 145.23 | 145.23 | 145.23 | 145.23 |
| Lup. TAEC | Organic Peroxide (Arkema Inc.) | 2.55 | 2.55 | 2.55 | 2.55 | 2.55 |
| FlexiBloc | Macroinitiator from PMEA | — | 33.72 | — | — | 63.13 |
| FlexiBloc | Macroinitiator from PEA | — | — | 29.39 | 55.02 | — |

Formulation #1 is a control with no macroinitiator, which includes a low profile agent.
Formulations #2, #3, #4, and #5 contain macroinitiator, and no low profile agent.

Formulations 1-5 were tested on an Instron Dyna-Tupp falling dart impact tester. The results are shown on Table 8. The control sample (#1) produced very poor results in falling dart impact testing. Test samples were extremely brittle yielding a very noisy signal from the instrument. Formulation #2 contained 7.3 wt % macroinitiator made from methoxyethyl acrylate. The impact signal from this sample was more consistent, with less noise. Formulation #3 contains 7.3 wt % of macroinitiator made from ethyl acrylate. We saw little improvement in impact signal from this formulation, versus the control. Formulation #4 contains 11.7% of macroinitiator from ethyl acrylate. We saw improved impact signal from Formulation #4 (compared to the control and Formulation #3), with much less noise in the signal and more consistent results.

TABLE 8

| Sample | Table 7 sample # | First Break Energy (J) | Std. Dev. | Deflection (mm) | Std. Dev. |
|---|---|---|---|---|---|
| Control | 1 | 0.31 | 0.03 | 0.74 | 0.03 |
| 7.3% PEA | 2 | 0.82 | 0.08 | 1.86 | 0.24 |
| 7.3% PMEA | 3 | 0.45 | 0.09 | 1.16 | 0.21 |
| 11.7% PEA | 4 | 0.86 | 0.09 | 1.98 | 0.16 |
| 11.7% PMEA | 5 | 0.86 | 0.12 | 1.89 | 0.20 |

The results in Table 8 clearly demonstrate the toughening effect of the macroinitiators of the present invention.

Example 10

The living polybutyl acrylate macroinitiators of the present invention can be in the form of solutions. Solutions were prepared as a 50%-75% w/w solution of the living polybutyl acrylate macroinitiators in the following solvents: butyl acetate, toluene, ethylbenzene, methyl ethyl ketone, dioxane, tetrahydrofuran, acetone, styrene, octyl acrylate, butyl acrylate and methylmethacrylate.

Example 11

A solution polymerization using the macroinitiators of the present invention was completed. A stainless steel reactor was charged with 60 g of polybutyl acrylate macroinitiator, 176 g of toluene and 325.8 g styrene. The solution was polymerized for 5 hours at 115°-120° C. for 5 hours. The conversion of styrene was 30%.

Example 12

A solution polymerization using the macroinitiators of the present invention was completed. A stainless steel reactor was charged with 200 g of polybutyl acrylate/acrylic acid macroinitiator, 340 g toluene and 128 g styrene. The solution was polymerized at 115°-118° C. for 2 hours. The conversion of styrene was 28%.

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A modified composite material formed by reacting one or more vinyl aromatic monomer(s) further comprising an unsaturated resin selected from the group consisting of isophthalic resin, phthalic resin, terephthalic resin, dicyclopentadiene resin, epoxy resin, and vinyl ester polyester resin, and optionally further comprising glass fiber reinforcements and/or fillers, non-vinyl aromatic monomer(s), polymers, free radical sources, low profile additives, pigments, thickeners, inhibitors, toughening agents, release agents, and mixtures thereof in the presence of (meth)acrylic macroinitiators having at least one nitroxyl end group.

2. The modified composite material of claim 1 wherein said vinyl aromatic monomer(s) are of the formula

Formula I wherein R is hydrogen or methyl, Ar an aromatic ring structure having from 1 to 3 aromatic rings with or without alkyl, halo, or haloalkyl substitution.

3. The modified composite material of claim 1 wherein said vinyl aromatic monomer(s) are selected from the group consisting of styrene, substituted styrene, alpha-methylstyrene, isomers of vinyl toluene, isomers of ethyl styrene, propyl styrene, vinyl biphenyl, vinyl naphthalene, vinyl anthracene, and mixtures thereof.

4. The modified composite material of claim 1 wherein from about 1.0 to about 30 percent by weight of said (meth) acrylic macroinitiator is added to said vinyl aromatic monomer(s).

5. The modified composite material of claim 1 wherein said (meth)acrylic macroinitiator is a (meth)acrylic homopolymer or copolymer selected from the group consisting of acrylic acid, methacrylic acid, the salts, esters, anhydrides and amides of methacrylic acid, the salts, esters, anhydrides and amides of acrylic acid, fluorinated acrylic monomers, dicarboxylic acid anhydrides, acrylamides, carboxyethyl acrylate, fumaric acid, crotonic acid, maleic acid, itaconic acid, and the corresponding anhydrides carbonyl halides, amides, amidic acids, amidic esters, and full and partial esters of maleic acid and itaconic acid and mixtures thereof.

6. The modified composite material of claim 1 wherein said (meth)acrylic macroinitiator is a copolymer further comprising ethylenically unsaturated monomers selected from the group consisting of, anhydrides, acrylonitrile, vinyl esters, alpha-olefins, dienes, substituted or unsubstituted mono and dialkyl esters of unsaturated dicarboxylic acids, vinyl aromatics, cyclic monomers, monomers containing alkoxylated side chains, sulfonated monomers, and vinyl amide monomers and mixtures or thereof.

7. The modified composite material of claim 1 wherein said (meth)acrylic macroinitiator comprises diblock copolymers, triblock copolymers, multiblock copolymers, star polymers, comb polymers, or gradient polymers.

8. The modified composite material of claim 1 wherein said vinyl aromatic monomer(s) further comprise a monomer selected from the group consisting of acrylic acid, methacrylic acid, alkyl esters and mixed esters of (meth)acrylic acid, acrylonitrile, methacrylonitrile, maleic anhydride, maleimide, di-olefins, phenylmaleimide, methyl methacrylate, butyl acrylate, methyl acrylate, maleic anhydride, fumaric acid, phthalic anhydride, maleimide, phenylmaleimide, dienes, and mixtures thereof.

9. The modified composite material of claim 1 wherein said (meth)acrylic macroinitiators having at least one nitroxyl end group is a β-phosphorous nitroxide radical of the formula:

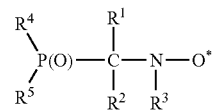

in which $R^1$ and $R^2$, are identical or different, and selected from a hydrogen atom, a linear, branched or cyclic alkyl radical having from 1 to 10 carbon atoms, an aryl radical, or an aralkyl radical having from 1 to 10 carbon atoms, or $R^1$ and $R^2$ are connected to one another so as to form a ring having from 3 to 8 carbon atoms; $R^3$ is a linear or branched, saturated or unsaturated hydrocarbonaceous radical having from 1 to 30 carbon atoms; and $R^4$ and $R^5$, are identical or different, selected from a linear or branched alkyl radical having from 1 to 20 carbon atoms, a cycloalkyl, aryl, alkoxyl, aryloxyl, aralkyloxyl, perfluoroalkyl, aralkyl, dialkyl- or diarylamino, alkylarylamino or thioalkyl radical, or $R^4$ and $R^5$ are connected to one another so as to form a heterocycle which includes the phosphorus atom, said heterocycle having from 2 to 4 carbon atoms and optionally further including one or more oxygen, sulfur or nitrogen atoms.

10. The modified composite material of claim 1 wherein said (meth)acrylic macroinitiator is monofunctional, difunctional, multifunctional or mixtures thereof.

11. The modified composite material of claim 1 wherein said (meth)acrylic macroinitiator is dissolved in a solvent selected from the group consisting of butyl acetate, toluene, ethylbenzene, xylene, methylethyl ketone, dioxane, tetrahydrofuran, acetone, styrene, butyl acrylate, octyl acrylate, and methylmethacrylate and mixtures thereof.

* * * * *